United States Patent [19]

Kozlov et al.

[11] 4,043,670

[45] Aug. 23, 1977

[54] SPECTROMETER AND METHOD OF EXAMINING SPECTRAL COMPOSITION OF LIGHT

[76] Inventors: Jury Georgievich Kozlov, Zheleznovodskaya ulitsa, 31, kv. 39; Alexandr Iosifovich Lopatin, Aviagorodok, 10, kv. 9, both of Leningrad, U.S.S.R.

[21] Appl. No.: 586,096

[22] Filed: June 11, 1975

[30] Foreign Application Priority Data

June 13, 1974 U.S.S.R. ............................... 2033027

[51] Int. Cl.² ........................... G01B 9/02; G01J 3/00
[52] U.S. Cl. ................................. 356/106 S; 356/88; 356/98
[58] Field of Search .................. 356/74, 88, 98, 106 S

[56] References Cited
FOREIGN PATENT DOCUMENTS 127,054  3/1960  U.S.S.R. ................................. 356/88

*Primary Examiner*—F. L. Evans

*Attorney, Agent, or Firm*—Lackenbach, Lilling & Siegel

[57] ABSTRACT

The spectrometer comprises a symmetrical ruled diffraction grating with the collimated light beam under examination being incident thereupon diffracting in the right and left diffraction orders, into two light rays of a preset wavelength. One of these light rays returns to the diffraction grating, being reflected from a scanning mirror common to both light rays. The other light ray returns to the same diffraction grating after being reflected from an additional mirror, whose reflecting surface is parallel to the diffraction grating rulings, then from the scanning mirror, common to both light rays, and again from the additional mirror. Upon returning both light rays diffract in the same direction, interfere with each other and are registered. The method of examining the spectral composition of light realized through the use of the above-mentioned spectrometer, consists in using two twice diffracted light rays which have been reflected $(2n+1)$ and $(2n+3)$ times from two reflecting surfaces, where n is a natural number.

10 Claims, 6 Drawing Figures

SPECTROMETER AND METHOD OF EXAMINING SPECTRAL COMPOSITION OF LIGHT

The present invention relates to optical instruments and more particularly to spectrometers and to methods of examining the spectral composition of light realized by means of this spectrometer in qualitative and quantitative analysis.

Of all instruments currently used in spectroscopy, slit are most common. Basically any slit spectrometer consist of an entrance slit situated in the focal plane of the collimator, forming a parallel light beam, a dispersing element (prism or diffraction grating), an exit lens and an exit slit situated in the focal plane of the latter and providing for a selection of the outgoing light beam by wavelengths.

The resolution and luminosity of such a spectrometer are in reverse relations with the slit width: the narrower the slits the higher the resolution, while the luminosity is lower, and vice versa. Besides as the slit cannot be made infinitely narrow due to the diffraction phenomenon, a necessity arises to use long-focus collimators to maintain an adequate resolution of the dispersing element. Owing to this medium-range spectrometers are 1,5–2 m. long, and high-range instruments may be as long as 6 meters and ever more.

Two types of essentially new slitters spectrometers have been proposed of late, in which use is made of the phenomenon of interference: a Fourier-spectrometer and an interferential selective amplitude modulation spectometer (to be referred to further as SISAM). Their application can dramatically improve spectroscopy bringing it to a unprecedentedly high level: firstly, it is possible to increase the spectrometers luminosity hence their sensitivity, by two or three orders of magnitude; secondly data acquisition rate can be improved to the same extent, i.e., spectral analysis can be made extremely rapidly; and thirdly it is possible to realize the theoretical resolution of a dispersing element practically at any focal distances of the entrance collimator and the exit lens, thereby cutting down the size and weight of spectrometers tens and even hundreds of times.

Fourier-spectrometer is in fact a Michelson interferometer with a single mirror which is adapted to move along the interferometer axis near the zero interfering beams path difference position. A serious disadvantage inherent in Fourier-spectrometers is the necessity of decoding a recorder signal with the help of a computer. Furthermore, it is sensitive to an intensity variation in the light being examined during recording, mechanical system for driving the mirror is to complicated and sensitive to mechanical interferences and the working spectral interval is limited by the transparence range of the semi-transparent base of the mirror.

The SISAM is a double beam interferometer whose two arms include dispersing elements placed so, that interference is observed in proximity to only one wavelength.

The method of interferential selection by wavelengths is effected by periodically changing the path difference of the interfering light beams. In this case an amplitude modulation of the outgoing light beam is observed only at the interference wavelength. The variable of the outgoing light beam registered by a receiving and measuring circuit is proportional to the light intensity at the interference wavelength.

All prior art SISAMs are disadvantageous in that for adjusting and operating the instrument it is necessary to obtain an interference accuracy of different components of the instrument from 7° to 12° of freedom, i.e., all angles should be accurate to second and travels to fractions of a wavelength.

It can be inferred from the foregoing that even precision instruments possess low static and kinematic stability to mechanical interferences; adjusting such instruments is a most complicated operation; the scanning system is so complicated that at present the scanning limits do not exceed several hundred of resolved intervals (for a visible spectral range of about 10 A).

Besides, the spectral range of most SISAMs is limited by the transparence range of semi-transparent mirrors; in all known SISAMs the frequency and phase of the modulated signal varies with scanning through the spectrum, i.e., they do not permit synchronous detection of the signal being registered; the modulation frequency does not exceed 100 Hz, which substantially slows down analysis; due to the complexity of the mechanical scanning system, instruments have the same size and weight as slit spectrometers; the cost of the prior art SISAMs is much higher than that of slit spectrometers.

One of the known SISAM arrangements makes use of the property of a symmetrically ruled diffraction grating to provide for the right and left diffraction orders of a similar intensity. These symmetrical diffraction orders are used to the arms of the interferometer making up the SISAM. To this end use is made of a system comprising two or three mirrors which return the rays of symmetrical orders to the grating so that after diffracting repeatedly on the latter, the rays could interfere selectively. This spectrometer suffers from all above-mentioned drawbacks.

There is also known a SISAM comprising a symmetrically ruled diffraction grating, an additional mirror whose reflecting surface is normal to the working surface of the diffraction grating, and two scanning mirrors mounted on a common base which is adopted to rotate about the axis passing through the middle of a straight line connecting the centres of the scanning mirrors. In this spectrometer, the light beam being examined is incident on the diffraction grating at a right angle and diffracts, in the right and left diffraction orders, into two light rays of a given wavelength. One of these rays return to the diffraction grating after having been reflected in an autocollimating manner from one of the scanning mirrors, and the other returns to the diffraction grating after having been reflected alternately from the additional mirror, then in an autocollimating manner, from the second scanning mirror, and again from the additional mirror. Upon returning, both light rays diffract in the same direction and interfere. Reciprocating motion of the additional mirror is used to modulate the outgoing light beam. The scanning mirrors are arranged so that the rays passing through the grating centre have a zero path difference.

This spectrometer also suffers from the above-mentioned drawbacks. In addition, the quality of the above-described design is deteriorated by a considerable interference order change rate in the case of scanning over the spectrum and vignetting of the light rays.

A method of examining the spectral composition of light has been proposed, realised with the above-described spectrometer, which consist in interference of twice diffracted light rays, reflected from the reflecting surfaces, the number of reflections of the first and second rays differing by two, i.e. one of them returns to the diffraction grating after one reflection while the other, after three reflections.

It is object of the present invention is to provide a spectrometer (SISAM) with simple scanning over the spectrum.

Another object of the invention is to provide a spectrometer (SISAM) with a modulation independent of the light wavelength.

Still another object of the invention is to provide a spectrometer (SISAM) with high immunity to mechanical interferences.

Yet another object of the invention, is to provide a spectrometer (SISAM) of small size and weight.

A further object of the invention is to provide a spectrometer (SISAM) with variable resolution.

One more object of the invention is to provide a spectrometer (SISAM) suitable for examining the spectral composition of light in any spectral band.

Still one more object of the invention is to provide a method examining the spectral composition of light realised through the use of the above-mentioned spectrometer and permitting the spectrometer cross-section to be reduced.

These objects are attained by that in a spectrometer (SISAM) wherein a collimated light beam is incident on a symmetrically ruled diffraction grating, diffracts, in the right and left orders of diffraction, into two light rays of a given wavelength, one of these rays returning to the diffraction grating after having been reflected from a first scanning mirror, while the other ray returns to the same diffraction grating after having been reflected first from an additional mirror, then a second scanning mirror, and again from the additional mirror, and both light rays diffract upon returning in the same direction, interfere and or registered by a recording device, whose reading is indicative of the spectral composition of the light beam being examined, according to the invention, the additional mirror is placed relative to the diffraction grating so that its reflecting surface is parallel to the diffraction grating rulings, and the first and second scanning mirrors are integrated into one with their reflecting surfaces lying in the same plane so that both light rays or reflected completely from the reflecting surface of the integrated scanning mirror.

In order to render the resolution of the SISAM variable it is desirable to adapt the additional mirror to reciprocating motion relative to the diffraction grating.

To attain maximum (for the dispersing element being used) luminosity it is advisable to install the additional mirror in immediate proximity to the diffraction grating.

To minimize vignetting of the light rays the axis of rotation of the integrated scanning mirror should preferably be parallel to the diffraction grating rulings.

It is also desirable to minimize vignetting of the light beams, to align the axis of rotation of the integrated scanning mirror with the line of intersection of the plane in which lies the reflecting surface of the additional mirror and the plane in which lies the working surface of the diffraction grating.

The present invention also provides a method of examining the spectral composition of light, realised with the above spectrometer, which consist in interference of two twice diffracted light rays which have been reflected from two reflecting surfaces, the number of reflections of the first and second rays differing by two, and in which according to the invention use is made of interference of light rays that have been reflected $(2n+1)$ and $(2n+3)$ times, $n$ — being a natural number.

According to the invention, SISAM the realizing the proposed method possesses a high immunity to mechanical interferences and a simple scanning means, hence is small in size and weight.

The invention will now be described in greater detail with reference to specific embodiments thereof, taken in conjunction with the accompanying drawings wherein.

Figure 1:
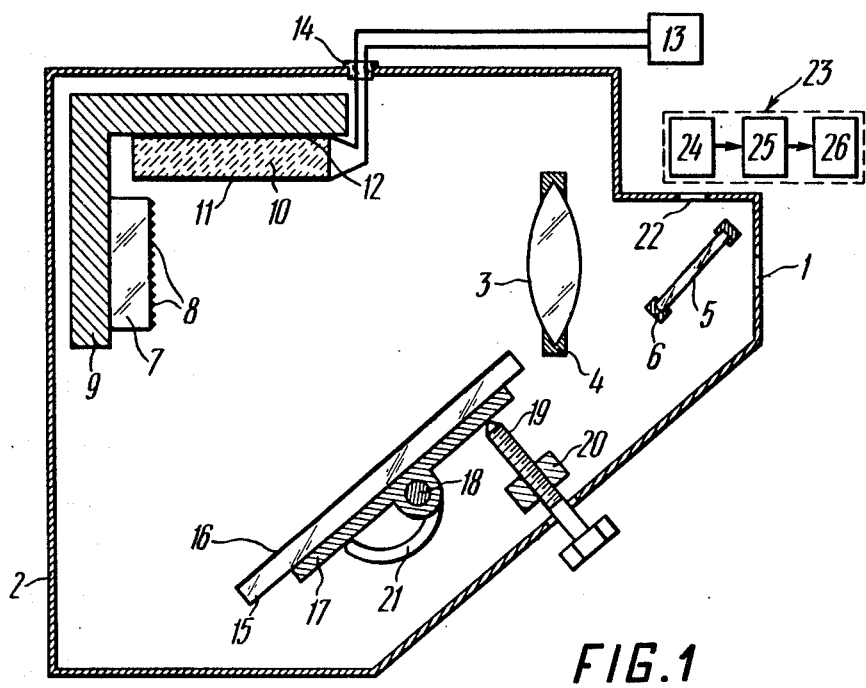
FIG. 1 is a schematic of a spectrometer (SISAM) realising the prior art and proposed methods of examining the spectral composition of light.

The spectrometer with interferential selective amplitude modulation (SISAM), realizing the prior art and proposed method of examining the spectral composition of light, comprises an entrance aperture 1 (FIG. 1) accomodated in a case 2 and lying in the focal plane and on the optical axis of a collimating means in the form of a lens 3 secured in a cell 4. A semi-transparant mirror 5 is located between the lens 3 and the entrance aperture 1 and secured in a cell 6 at an angle of 45° to the optical axis of the lens 3. A plane diffraction grating 7 with symmetrical rulings 8 making up its working surface is fixed on a base 9 in the case 2. An additional mirror 10 is fixed on the same base in immediate proximity to the diffraction grating 7. The additional mirror 10 represents a piezo-ceramic capacitor with plates 11 and 12, the plate 11 being the reflecting surface (further referred to as the reflecting surface 11) of the additional mirror 10. Both plates 11 and 12 are coupled to a generator 13 of the type described in "Amateur Radio Engineer's Handbook" edited by R. M. Malinin, ed. "Energia" Publishers, Moscow, 1973, (in Russian), which is connected to conductors passing through the case 2 via an insulator 14.

The additional mirror 10 is so arranged relative to the diffraction grating 7 that its reflecting surface 11 is parallel to the rulings 8 of the diffraction grating 7 and normal to the working surface of the diffraction grating 7, the optical axis of the lens 3 passing through the middle of the grating 7.

An integrating (common) scanning mirror 15 with a reflecting surface 16 is also accomodated in the case 2, being fixed on a base 17 which is adapted for rotation about an axis 18 by means a screw 19 and a nut 20. The base 17 is positioned in place by means of a spring 21.

The axis 18 (FIG. 2) of rotation of the integrated scanning mirror 15 is parallel to the rulings 8 of diffraction grating 7.

An exit aperture 22 (FIG. 1) is arranged in the case 2 symmetrically to the entrance aperture 1 relative to the mirror 5. Behind the exit aperture 22, the focal plane of the lens 3, a recording device 23 is provided comprising a radiation receiver 24 (e.g. a photomultiplier of the type described in the "Spectroscopy Technology and Application" by A.N. Zaidel, G. V. Ostrovsky and Yu.I. Ostrovsky, "Nauka" Publishers, Moscow, 1972) a selective amplifier 25, and a recorder 26, for example an oscilloscope.

The additional mirror 10 serves as a modulator in the embodiment under consideration, and the semi-transparant mirror 5 (FIG. 2) serves as a means for separation of an incoming beam 27 and an outgoing beam 28 being examined.

The above described design of the SISAM can successfully realize both the prior art method of examining the spectral composition of light (a), disclosed in the USSR Inventor's Certificate N 127,054; C1 G 02 f 1/38, as well as the method (b) according to the invention which will be described herein below.

In order to realize the method (a) by using the spectrometer according to invention, the incoming light beam 27 being examined passes through the entrance aperture 1, the semi-transparent mirror 5 and the lens 3 is incident on the diffraction grating 7 and diffracts, in the right and left diffractions orders, into two light rays 29 and 30 of a given wavelength.

The two diffraction light rays 29 and 30 return to the diffraction grating 7, the beam 29 after having been reflected from the reflecting surface 16 of the integrated scanning mirror 15 common to both rays, and the light ray 30 after having been reflected first from the reflection surface 11 of the additional mirror 10, then from the reflecting surface 16 of the scanning mirror 15, and once again from the surface 11.

Upon returning, both rays diffract in the same direction as the outgoing light beam 28 being examined, interfere with each other, pass through the lens 3, are reflected from the mirror 5, pass through the exit aperture 22 and are registered by the recording device 23 (FIG. 1) whose readings enable the investigator to determine the spectral composition of the light beam being examined.

Figure 2:
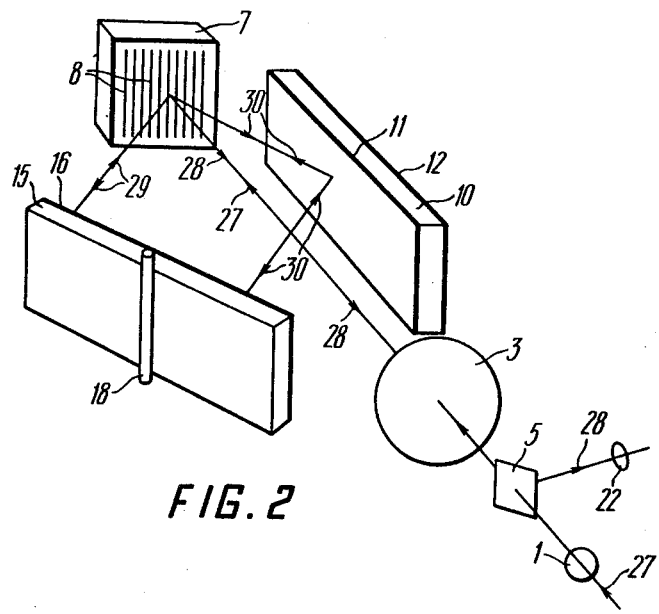
FIG. 2 is an optical diagram of the spectrometer of FIG. 1.

The additional mirror 10 also serving as a modulator periodically changes the path difference of the interfering light rays 29 and 30 (FIG. 2).

Figure 3:
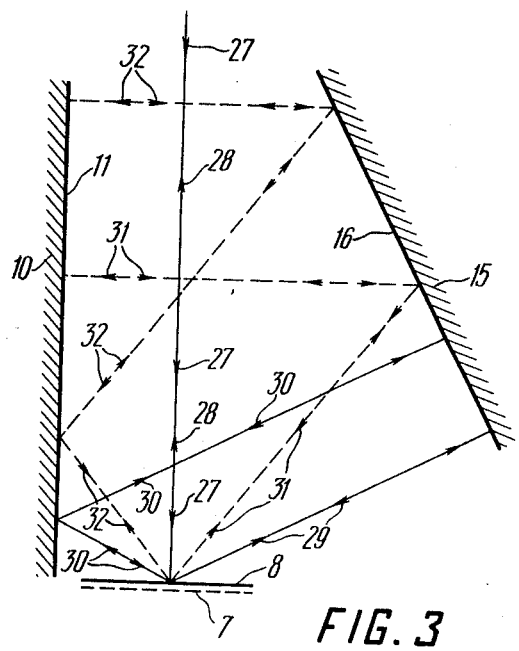
FIG. 3 shows conventionally some optical elements of the spectrometer represented in FIG. 1 and the part of light rays for the prior art and proposed methods of examining the spectral compositon of light realized through the use of the proposed spectrometer.

In order to realize the method (b) by the spectrometer according to the invention, the incoming light beam 27 (FIG. 3) being examined passes through the entrance aperture 1 (FIG. 1), the semi-transparent mirror 5 and the lens 3 is incident on the diffraction grating 7 and diffracts, in the right and left diffraction orders into two light rays 31 and 32 (FIG. 3) of a given wavelength (in the diagram, the light rays according to the method (a) are represented by continuous line, and according method (b), by a dotted line).

Two diffracted light rays 31 and 32 return to the diffraction grating 7 (FIG. 1) after having been reflected from two reflecting surface 11 and 16 (FIG. 3), the number of reflections of the first and second light rays 31 and 32 differing by two.

Used in the method according to the invention is interference of the light rays 31 and 32 which have been reflected $(2n+1)$ and $(2n+3)$ times, where $n$ is a natural number, $n = 1$ hence the number of reflection for the light ray 31 is equal 3 and for the light ray 32 is equal to 5 respectively.

Thus the light ray 31 returns to the diffraction grating 7 after having been reflected first from the reflecting surface 16 of the integrated scanning mirror 15, common to both light rays, then the reflecting surface 11 of the additional mirror 10, and again from the reflecting surface 16 of the scanning mirror 15, while the light ray 32 return to the same diffraction grating 7 after having been reflected first from the reflecting surface 11 of the additional mirror 10, then from the reflection surface 16 of the scanning mirror 15, reflecting surface 11, reflecting surface 16, and once again from the reflecting surface 11. Upon returning, both light rays 31 and 32 diffract in the same direction in the form of the outgoing light beam 28 being examined, interfere with each other, pass through the lens 3 (FIG. 1), are reflected from the mirror 5, go out through the exit aperture 22, and are registered by the recording device 23 whose readings enable the investigation to determine the spectral composition of the light beam being examined.

By limiting the dimensions of the integrated scanning mirror 15 it is possible to realize either the prior art method (a) or the herein proposed method (b) of examining the spectral composition of light. The realization of the method according to the invention enables the distance between the additional mirror 10 and integrated scanning mirror 15, hence the cross-section the spectrometer to be reduced.

In the above-described embodiment of the spectrometer (SISAM), according to the invention, the reflecting surface 11 (FIG. 1) of the additional mirror 10 is set at a right angle to the working surface of the diffraction grating 7. However it can be set at any other angle than 90°.

Figure 4:
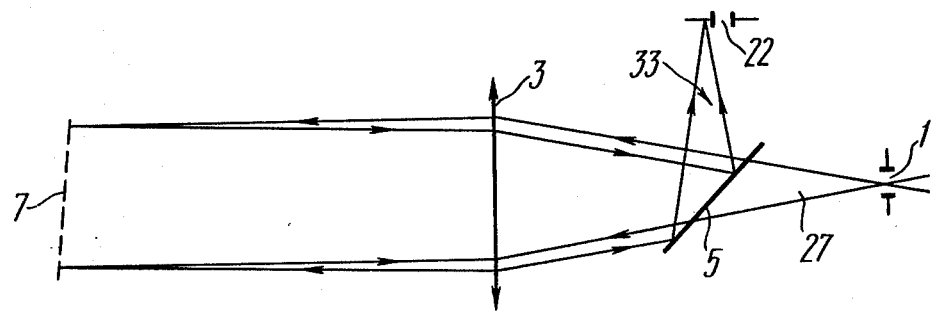
FIG. 4 shows the path of light rays in the spectrometer represented in FIG. 1, through a plane parallel to the diffraction grating rulings.

In the spectrometer, according to the invention, the diffraction grating 7 (FIG. 4) is installed so that a light ray 33 of the zero order of diffraction doesn't enter the exit aperture 22.

Figure 5:
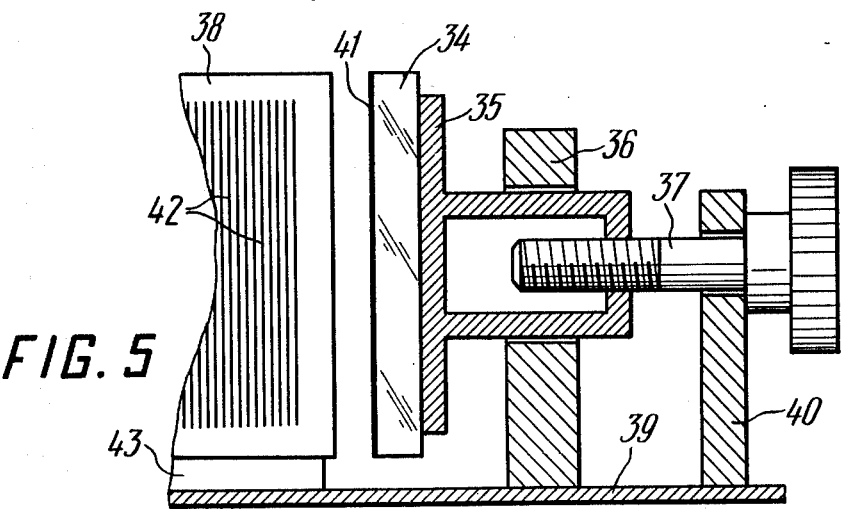
FIG. 5 shows an embodiment of the additional mirror (cross-section) and, partly, diffraction grating.

In an other embodiment, according to the invention an additional mirror 34 (FIG. 5) is secured on the base 35 and adapted for reciprocating motion in a holder 36 with a screw 37, relative to the diffraction grating 38. The holder 36 is secured an a common base 39, the screw 37 entering a lug 40 of the base 39.

A reflecting surface 41 of the additional mirror 34 is arranged parallel to the rulings 42 of the diffraction grating 38 mounted on a base 43 which, in turn, is mounted on the common base 39.

In all the above-described embodiments of the spectrometer according to the invention, the axis of rotation of the integrated scanning mirror is parallel to the rulings of the diffraction grating. However, still another embodiment of the spectrometer, is possible, wherein the axis 44 (FIG. 6) of rotation of the integrated scanning mirror 45 coincides with a line 46 of the intersection of a plane 47 in which lies a reflection surface 48 of an additional mirror 49 with a plane 50 which lies in the working surface of a diffraction grating 51, formed by rulings 52 of the grating 51.

Figure 6:
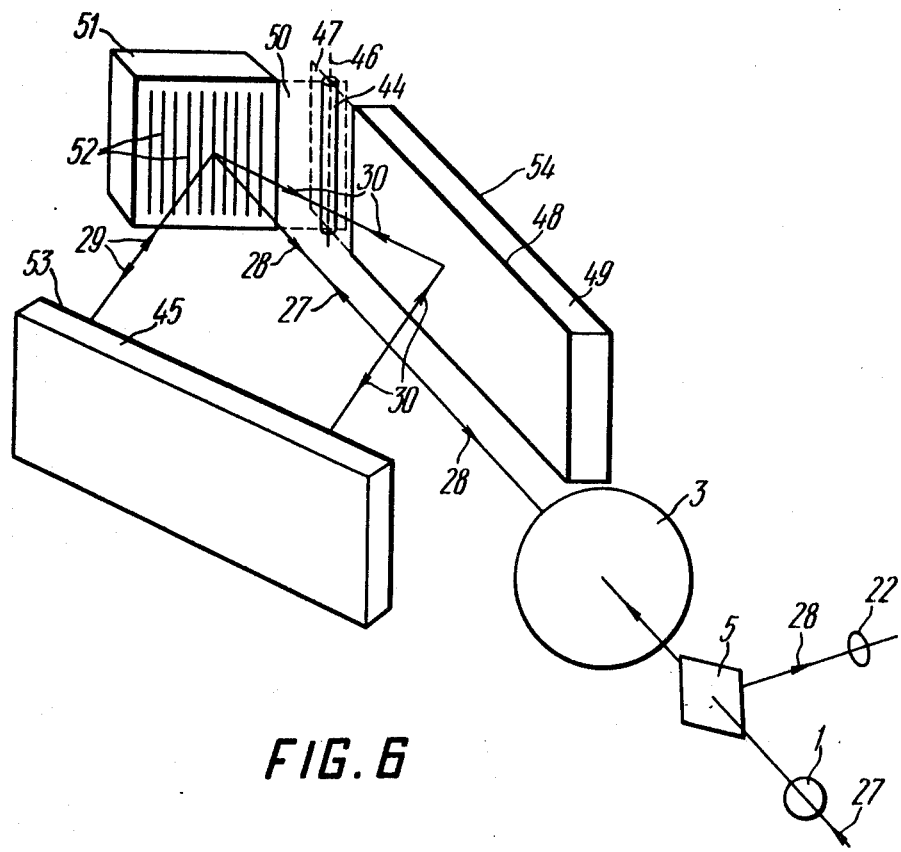
FIG. 6 is an optical diagram of another embodiment of the spectrometer in accordance with the invention.

In FIG. 6 designated as 53 is the reflecting surface of the integrated scanning mirror 45, and 54 stands for the plate of the additional mirror 49, the other designations being same as in to FIG. 2.

The principle of operation of the spectrometer (SISAM) according to the invention, realizing the prior art and herein proposed method of examining the spectral composition of light is as follows.

The light beam 27 being examined (FIG. 2 and 3) after a second diffraction is distributed along the directions determined by the distance between the rulings 8 of the diffraction grating 7. In this case, the rays 29 and 30 as well as 31 and 32 (FIG. 3) of a given wavelength diffract in the same direction. It means that the images of all the points of the entrance aperture 1 (FIG. 1), formed by the light rays 29 and 30 as well as 31 and 32 (FIG. 3) of a given wavelength coincide at the exit aperture 22 (FIG. 1).

For the light of other wavelength, respective points of the aperture 1 do not coinside, which means that the interference at the exit aperture 22 occurs selectively at a given wavelength. With periodical changes in the path difference of the interfering light rays, which is effected by the reciprocating motion of the reflecting surface 11 of the additional mirror 10 when it is energised by the generator 13, the intensity of the outgoing light ray 28 (FIG. 2 and 3) of a given wavelength changes periodically. The rays of the light beam being examined, having wavelengths close to a preset one will also pass through the exit aperture 22 (FIG. 1), but their intensity will not be modulated. The light beam examined and recorded by the radiation reseiver 24 (FIG. 1) of the recording device 23, includes a variable component determined by the light of given wavelength and a constant component determined by the light of other wavelengths which have passed through the exit aperture 22. The variable component separated amplified by the selective amplifier 25 and registered by the recorder 26, is proportional to the light intensity of a given wavelength only, which is indicative of the spectral composition of the light being examined.

When the integrated scanning mirror 15 rotates about the axis 18, scanning over the spectrum takes place.

Since the light rays 29 and 30 (FIG. 2) as well as 31 and 32 (FIG. 3) are parallel to one another and reflected from the integrated scanning mirror 15 (FIG. 1) in asimilar way, the interference order of said light beams does not change with the reciprocating motion of the scanning mirror 15, while orbitrary rotation of the integrated scanning mirror results only in scanning over the spectrum or in shifting of the outgoing light beam 28 (FIG. 2 and 3) being examined in plane of the aperture 22 (FIG. 1). This means that the axis of rotation of the integrated scanning mirror 15 may be orbitrarily located in space, and the interference order is determined only mechanically by the rigid system diffraction grating 7 — additional mirror 10.

The modulation frequency and phase in the embodiment under consideration do not depend on the wavelength of the interfering light rays 29 and 30 (FIG. 2) as well as 31 and 32 (FIG. 3), as the displacement of the reflecting surface 11 (FIG. 1) of the additional mirror 10 by a distance equal to 1/4 of that between the rulings results in a change in the path difference of the interfering rays by half an wavelength at any point of the spectral interval of scanning. This permits applying synchronous detection of the recorded signal.

The resolution of the SISAM, according to the invention, is not less than the quadrupled theoretical resolution of the diffraction grating 7 used as a geometrical path difference is added to the diffraction path difference of the interfering light rays 29 and 30 as well as 31 and 32 (FIG. 3); the geometrical path difference is determined by the gap between the diffraction grating 7 and additional mirror 10, an increase in the gap width enhancing the resolution of the spectrometer and reducing its luminosity. Therefore for obtaining a maximum luminosity it is advisable to arrange the additional mirror 10 (FIG. 1) in immediate proximity to the diffraction grating 7, i.e., with as small a gap as possible.

Besides, this permits, by adapting the additional mirror 34 (FIG. 5) for reciprocating motion, to provide a spectrometer, according to the invention, with variable resolution.

If the axis of rotation of the integrated scanning mirror is located arbitrarily, the light rays reflected last will move on its reflecting surface during scanning.

When the axis 18 (FIG. 2) of rotation is arranged parallel to the rulings 8 of the diffraction granting 7, as has been described above, the shifting of the light rays 29 and 30 as will as 31 and 32 (FIG. 3) over the reflecting surface of the integrated scanning mirror 15 (FIG. 2) is minimized in a direction which is parallel to the rulings 8 of the diffraction grating 7.

In the SISAM, according to the invention, represented in FIG. 6 the shifting of the light rays 29 and 30 over the reflecting surface 53 of the integrated scanning mirror 45 is minimum.

The SISAM, according to the invention, realizing the prior art and herein proposed method of examining the spectral composition of light, processes high immunity to mechanically interference, as the quality of interference being determined mechanically by the rigid system diffraction grating-additional mirror, in which only the reflecting surface of the additional mirror must be parallel to the diffraction grating rulings to an interference accuracy, while the scanning system in the form of a integrated scanning mirror adopted to rotate about an arbitrary axis makes the proposed SISAM unique by its simplicity as compared to all conventional SISAMs.

The simplicity of the scanning system and noise immunity make it possible to design instruments considerably reduced in size, weigh and cost as compared to conventional SISAMs and slit spectrometers.

The independence of the modulation frequency and phase of the light wavelength permits during recording the use of synchronous detection methods the signal/-noise ratio $10^4$ times and more, as well as to raise the modulation frequency to hundreds of kiloherz.

Moreover, the proposed SISAM can be made up only of light reflecting elements suitable for any spectral band.

What is claimed is:

1. A spectrometer comprising: means defining an entrance aperture which permits passage of an incoming light beam to be examined; collimating means having a focal plane which is arranged so that said light beam being examined is incident thereon after passing through said entrance aperture; a diffraction grating having symmetrical rulings forming its working surface to define right and left diffraction orders, said diffraction grating being arranged so that the light beam being examined is incident thereon after passing through said collimating means, the light beam diffracting in said right and left diffraction orders into first and second light rays of a given wavelength; a first scanning mirror common to both said light rays, having a reflection surface and an axis of rotation, said first scanning mirror being arranged so that one of said light rays is incident thereon and, after having been reflected from said first scanning mirror, is incident again on said diffraction grating; a second mirror having a reflecting surface arranged generally orthogonal relative to said diffraction grating that its reflecting surface is parallel to said diffraction grating rulings, and the other one of said light rays is incident thereon, and after having been reflected from said second mirror, is incident on said first mirror and, after having been reflected from said first mirror, is incident on said second mirror and, after having been reflected from said second miror, is incident once again on said diffraction grating, said first and second light rays diffracting from said diffraction grating in the same direction to form interfering light rays which interfere with each other, and arrive at said collimating means in the form of the outgoing light beam to be examined; a modulator periodically changing the path difference of the interfering light rays; means defining an exit aperture which permits passage of an outgoing light beam to be examined; a device for recording said outgoing light beam located in said focal plane of said collimating means adapted to read the spectral composition of said light beam being examined.

2. A spectrometer as claimed in claim 1 where said second mirror includes means to provide reciprocating motion thereto relative to the said diffraction grating.

3. A spectrometer as claimed in claim 1 wherein said second mirror is located in the immediate proximity to said diffraction grating.

4. A spectrometer as claimed in claim 1 wherein said axis of rotation of said first scanning mirror is parallel to said rulings of said diffraction grating.

5. A spectrometer as claimed in claim 2 wherein said axis of rotation of said first scanning mirror is parallel to said rulings of said diffraction grating.

6. A spectrometer as claimed in claim 3 wherein said axis of rotation of said first scanning mirror is parallel to said rulings of said diffraction grating.

7. A spectrometer as claimed in claim 1, wherein said axis of rotation of said first scanning mirror coincides with the line of intersection of the plane of said reflecting surface of said second mirror and the plane of said working surface of said diffraction grating.

8. A spectrometer as claimed in claim 2 wherein said axis of rotation of said first scanning mirror coincides with the line of intersection of the plane of said reflecting surface of said second mirror and the plane of said working surface of said diffraction grating.

9. A spectrometer as claimed in claim 3 wherein said axis of rotation of said first scanning mirror coincides with the line of intersection of the plane of said reflecting surface of said second mirror and the plane of said working surface of said diffraction grating.

10. A method of examining the spectral composition of light comprising the following steps: receiving the incoming light beam to be examined; collimating said incoming light beam; first diffracting the collimated light beam being examined in the right and left orders of a diffraction grating into first and second light rays of a given wavelength; reflecting said first and second light rays from two reflecting surfaces arranged in different planes, the number of reflections of the first and second rays differing by two; second diffracting of said reflected first and second light rays in the same direction, interference of said first and second light rays which have been reflected $(2n+1)$ and $(2n+3)$ times taking place, respectively, where n is a natural number; modulating said interfering first and second light rays; transmitting said modulated first and second light rays in the form of an outgoing light beam to be examined by suitable recording apparatus.

* * * * *